United States Patent
Otake

(10) Patent No.: US 7,885,751 B2
(45) Date of Patent: Feb. 8, 2011

(54) VEHICLE INTEGRATED CONTROL APPARATUS INTEGRALLY EXECUTING VEHICLE DRIVING SUPPORT CONTROL, DRIVING FORCE CONTROL, AND BRAKING FORCE CONTROL

(75) Inventor: Hirotada Otake, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 858 days.

(21) Appl. No.: 11/794,720

(22) PCT Filed: Jan. 5, 2006

(86) PCT No.: PCT/JP2006/300241

§ 371 (c)(1),
(2), (4) Date: Jul. 6, 2007

(87) PCT Pub. No.: WO2006/073205

PCT Pub. Date: Jul. 13, 2006

(65) Prior Publication Data

US 2009/0281704 A1    Nov. 12, 2009

(30) Foreign Application Priority Data

Jan. 7, 2005    (JP)    ............................ 2005-002221

(51) Int. Cl.
*B60W 3/08* (2006.01)
*B60T 7/12* (2006.01)
*G06F 19/00* (2006.01)

(52) U.S. Cl. ........................... 701/96; 701/91; 701/301; 340/903

(58) Field of Classification Search .................. 701/96, 701/301, 83, 84, 91, 93; 340/903, 435, 436
See application file for complete search history.

(56) References Cited

U.S. PATENT DOCUMENTS

| 6,370,470 | B1 * | 4/2002 | Yamamura et al. | 701/96 |
| 6,553,297 | B2 * | 4/2003 | Tashiro et al. | 701/48 |
| 7,096,109 | B2 * | 8/2006 | Tanimichi et al. | 701/96 |
| 7,155,342 | B2 * | 12/2006 | Kobayashi et al. | 701/301 |
| 2005/0143893 | A1 * | 6/2005 | Takamatsu et al. | 701/91 |

FOREIGN PATENT DOCUMENTS

JP    5 85228    4/1993
JP    2001 30794    2/2001

(Continued)

*Primary Examiner*—Tan Q Nguyen
(74) *Attorney, Agent, or Firm*—Oblon, Spivak, McClelland, Maier & Neustadt, L.L.P.

(57) ABSTRACT

A driving support target braking/driving force is calculated by a driving support electronic controller, and transmitted to a first arbiter of a driving force control electronic controller. A vehicle driver requested target braking/driving force and the driving support target braking/driving force are arbitrated by the first arbiter, whereby a vehicle total target braking/driving force is calculated, and the vehicle total target braking/driving force is distributed to a vehicle target driving force and a vehicle target braking force by a braking/driving force distributor. A final target driving force is calculated by a second arbiter on the basis of the target driving force, and a driver requested braking force and the target braking force are arbitrated by an arbiter of a braking force control electronic controller, whereby a vehicle total target braking force is calculated.

19 Claims, 7 Drawing Sheets

FOREIGN PATENT DOCUMENTS

| JP | 2002 104156 | 4/2002 |
| JP | 2003 11801 | 1/2003 |
| JP | 2003 191774 | 7/2003 |
| JP | 2004 137905 | 5/2004 |
| JP | 2004 164188 | 6/2004 |

* cited by examiner

VEHICLE INTEGRATED CONTROL APPARATUS INTEGRALLY EXECUTING VEHICLE DRIVING SUPPORT CONTROL, DRIVING FORCE CONTROL, AND BRAKING FORCE CONTROL

TECHNICAL FIELD

The present invention relates to a vehicle integrated control apparatus, and more particularly to a vehicle integrated control apparatus that integrally executes a vehicle driving support control, driving force control, and braking force control.

BACKGROUND ART

As one of control apparatuses for vehicles such as automobiles, there has been known, for example, an integrated vehicle motion control apparatus that executes plural types of vehicle motion controls in a vehicle through an integral control of plural actuators by a computer on the basis of driving-related information relating to driving of a vehicle by a driver, as disclosed in Japanese Unexamined Patent Application No. 2003-191774 filed by the applicant of the present invention. This apparatus includes a host command section and sub-command section, wherein the host command section outputs an instruction to the sub-command section, and the sub-command section controls plural actuators on the basis of the instruction.

In the aforesaid conventional vehicle integrated control apparatus, when an abnormality occurs in the host command section, its influence is exerted on the sub-command sections. Therefore, the conventional vehicle integrated control apparatus has a problem in view of reliability. Further, it also entails a problem that, since information relating to plural types of vehicle motion controls and information necessary for the adjustment between sub-command sections should be inputted to the host command section, the amount of sending and receiving information between the host command section and the sub-command sections increases.

DISCLOSURE OF THE INVENTION

The present invention is accomplished in view of the aforesaid problems in the conventional integrated control apparatus configured to have the host command section and sub-command sections, in which the host command section outputs instructions to the sub-command sections and the sub-command sections control a plurality of actuators on the basis of the instructions.

The main object of the present invention is to reduce the amount of sending and receiving information between the respective control apparatuses by simplifying the sending and receipt of the information among the respective control apparatuses for the respective controls upon integrally executing a vehicle driving support control, driving force control, and braking force control, whereby the reliability of the integrated control is enhanced.

The foregoing main object is achieved by a vehicle integrated control apparatus comprising driving support calculation control means that calculates a vehicle target braking/driving control amount for performing a driving support by an automatic control of a braking/driving force; driving amount calculation control means that calculates a driver requested driving control amount on the basis of a driving operation by a driver and controls driving means on the basis of a final target driving control amount based upon at least the driver requested driving control amount; and braking amount calculation control means that calculates a driver requested braking control amount on the basis of a braking operation by a driver and controls braking means on the basis of a final target braking control amount based upon at least the driver requested braking control amount, wherein the target braking/driving control amount by the driving support calculation control means is transmitted to the driving amount calculation control means, and the driving amount calculation control means calculates the final target driving control amount by arbitrating the target braking/driving control amount and the driver requested driving control amount.

By virtue of this configuration, in a vehicle integrated control apparatus comprising driving support calculation control means that calculates a vehicle target braking/driving control amount for performing a driving support by an automatic control of a braking/driving force; driving amount calculation control means that calculates a driver requested driving control amount on the basis of a driving operation by a driver and controls driving means on the basis of a final target driving control amount based upon at least the driver requested driving control amount; and braking amount calculation control means that calculates a driver requested braking control amount on the basis of a braking operation by a driver and controls braking means on the basis of a final target braking control amount based upon at least the driver requested braking control amount, wherein the target braking/driving control amount by the driving support calculation control means is transmitted to the driving amount calculation control means, and the driving amount calculation control means calculates the final target driving control amount by arbitrating the target braking/driving control amount and the driver requested driving control amount, whereby the driving amount calculation control means can calculate the final target driving control amount on the basis of the target braking/driving control amount and the driver requested driving control amount. Accordingly, the driving force can be controlled on the basis of the driving operation by a driver, while achieving the driving support by the automatic control of the braking/driving force.

Further, with this configuration, it is unnecessary to transmit the information necessary for the arbitration of the target braking/driving control amount and the driver requested driving control amount from the driving amount calculation control means to the driving support calculation control means. Consequently, compared to the case in which the target braking/driving control amount and the driver requested driving control amount are arbitrated by the driving support calculation control means and the driving support calculation control means respectively transmits the target driving control amount and the target braking control amount to the driving amount calculation control means and the braking amount calculation control means, the amount of receiving and sending information between the driving support calculation control means and the driving amount calculation control means can be reduced.

By virtue of the aforesaid configuration, when the driving support calculation control means or target braking/driving control amount becomes abnormal, the transmission of the target braking/driving control amount to the driving amount calculation control means from the driving support calculation control means is stopped, resulting in that it can be prevented that the influence caused by the driving support calculation control means or the target braking/driving control amount being abnormal is exerted on the driving amount calculation control means and braking amount calculation control means.

According to one aspect of the present invention, in the aforesaid configuration, it is preferable that the driving amount calculation control means is configured to distribute the target braking/driving control amount after the arbitration to the target driving control amount and the target braking control amount, wherein the target braking control amount is transmitted to the braking amount calculation control means by the driving amount calculation control means.

By virtue of this configuration, the driving amount calculation control means distributes the target braking/driving control amount after the arbitration to the target driving control amount and the target braking control amount, and the target braking control amount is transmitted to the braking amount calculation control means by the driving amount calculation control means, whereby the driving amount calculation control means can distribute the target braking/driving control amount, which is the amount after the target braking/driving control amount and the driver requested driving control amount are arbitrated, to the target driving control amount and the target braking control amount, and the braking amount calculation control means can calculate the final target braking control amount on the basis of the target braking control amount and the driver requested braking control amount.

According to another aspect of the present invention, it is preferable that, in the aforesaid configuration, the braking amount calculation control means calculates the final target braking control amount by arbitrating the driver requested braking control amount and the target braking control amount.

By virtue of this configuration, the braking amount calculation control means calculates the final target braking control amount by arbitrating the driver requested braking control amount and the target braking control amount, whereby the braking force can be controlled on the basis of the braking operation by a driver, while achieving the driving support by the automatic control of the braking/driving force.

According to another aspect of the present invention, it is preferable that, in the aforesaid configurations, the driving support calculation control means calculates a risk avoidance target braking amount, when emergency braking for avoiding risk is necessary, and the risk avoidance target braking amount is directly transmitted to the braking amount calculation control means by the driving support calculation control means.

By virtue of this configuration, the driving support calculation control means calculates a risk avoidance target braking amount, when emergency braking for avoiding risk is necessary, and the risk avoidance target braking amount is directly transmitted to the braking amount calculation control means by the driving support calculation control means, whereby the driving support calculation control means can transmit the risk avoidance target braking amount to the braking amount calculation control means without delay, when emergency braking for avoiding risk is necessary. Consequently, compared to the case in which the risk avoidance target braking amount is transmitted to the braking amount calculation control means via the driving amount calculation control means, the emergency braking for avoiding risk can promptly be performed.

According to another aspect of the present invention, it is preferable that, in the aforesaid configuration, the braking amount calculation control means calculates the final target braking control amount by arbitrating the driver requested braking control amount, the target braking control amount, and the risk avoidance target braking amount.

By virtue of this configuration, the braking amount calculation control means calculates the final target braking control amount by arbitrating the driver requested braking control amount, the target braking control amount, and the risk avoidance target braking amount, whereby the braking amount calculation control means can calculate the final target braking control amount on the basis of the driver requested braking control amount, the target braking control amount, and the risk avoidance target braking amount.

According to another aspect of the present invention, it is preferable that, in the aforesaid configuration, the braking amount calculation control means defines the risk avoidance target braking amount as the final target braking control amount, when it receives the risk avoidance target braking amount from the driving support calculation control means, and the braking amount calculation control means calculates the final target braking control amount by arbitrating the driver requested braking control amount and the target braking control amount, when it does not receive the risk avoidance target braking amount from the driving support calculation control means.

By virtue of this configuration, the braking amount calculation control means defines the risk avoidance target braking amount as the final target braking control amount, when it receives the risk avoidance target braking amount from the driving support calculation control means, and the braking amount calculation control means calculates the final target braking control amount by arbitrating the driver requested braking control amount and the target braking control amount, when it does not receive the risk avoidance target braking amount from the driving support calculation control means, whereby the driving support calculation control means can calculate the final target driving control amount on the basis of the target braking/driving control amount and the driver requested driving control amount, when the emergency braking for avoiding risk is unnecessary. Consequently, the driving force can be controlled on the basis of the driving operation by a driver, while achieving the driving support by the automatic control of the braking/driving force. Further, when the emergency braking for avoiding risk is necessary, the driving support calculation control means surely calculates the final target braking control amount on the basis of the risk avoidance target braking amount, with the result that the emergency braking for avoiding risk can surely be achieved.

According to another aspect of the present invention, it is preferable that, in the aforesaid configurations, the driving support calculation control means calculates the target braking/driving control amount in accordance with a control mode of a driving support, and the control mode of the driving support is also transmitted from the driving support calculation control means to the driving amount calculation control means.

By virtue of this configuration, the driving support calculation control means calculates the target braking/driving control amount in accordance with a control mode of a driving support, and the control mode of the driving support is also transmitted from the driving support calculation control means to the driving amount calculation control means, whereby the driving amount calculation control means can appropriately arbitrate the target braking/driving control amount and driver requested driving control amount in accordance with the control mode of the driving support.

According to another aspect of the present invention, it is preferable that, in the aforesaid configurations, the driving support calculation control means stops the calculation of the target braking/driving control amount and the transmission to the driving amount calculation control means, when something abnormal occurs on the communication from the driving amount calculation control means to the braking amount calculation control means.

By virtue of this configuration, the driving support calculation control means stops the calculation of the target braking/driving control amount and the transmission to the driving amount calculation control means, when something abnormal occurs on the communication from the driving amount calculation control means to the braking amount calculation control means, whereby it is prevented that the target braking/driving control amount is uselessly calculated by the driving support calculation control means and the target braking/driving control amount is uselessly transmitted to the driving amount calculation control means, as well as the driving amount calculation control means and the braking amount calculation control means can control the driving force and braking force on the basis of at least the driver requested driving control amount and the driver requested braking control amount respectively in such a manner not considering the driver requested braking control amount.

According to another aspect of the present invention, it is preferable that, in the aforesaid configurations, the driving support is the automatic control of the braking/driving force for making the distance between the vehicle and the preceding vehicle constant.

According to another aspect of the present invention, it is preferable that, in the aforesaid configurations, the driving support is the automatic control of the braking/driving force for preventing that the distance between the vehicle and the preceding vehicle becomes less than a reference value.

According to another aspect of the present invention, it is preferable that, in the aforesaid configurations, the driving support is the automatic control of the braking/driving force for preventing the collision with an obstacle in front of the vehicle.

According to another aspect of the present invention, it is preferable that, in the aforesaid configurations, the target driving control amount is also transmitted from the driving amount calculation control means to the braking amount calculation control means, and the braking amount calculation control means corrects the target driving control amount with a correction amount for ensuring a stable running of the vehicle and transmits the target driving control amount after the modification to the driving amount calculation control means.

According to another aspect of the present invention, it is preferable that, in the aforesaid configurations, the driving amount calculation control means calculates the final target driving control amount on the basis of the target driving control amount before the modification and the target driving control amount after the modification.

According to another aspect of the present invention, it is preferable that, in the aforesaid configurations, the braking amount calculation control means corrects the target braking control amount after the arbitration with a correction amount for ensuring a stable running of the vehicle, and calculates the final target braking control amount on the basis of the target braking control amount after the modification.

According to another aspect of the present invention, it is preferable that, in the aforesaid configurations, the driving means includes a hybrid system provided with an internal combustion engine and an electric motor generator.

According to another aspect of the present invention, it is preferable that, in the aforesaid configurations, the electric motor generator has a regenerative function; and the braking amount calculation control means distributes the final target braking control amount to a target friction braking control amount and a target regenerative braking control amount; and the target regenerative braking control amount is transmitted from the braking amount calculation control means to the driving amount calculation control means.

According to another aspect of the present invention, it is preferable that, in the aforesaid configurations, the driving amount calculation control means controls the internal combustion engine on the basis of the final target driving control amount and controls the electric motor generator on the basis of the target regenerative braking control amount.

BEST MODE FOR CARRYING OUT THE INVENTION

Some preferred embodiments of the present invention will be explained in detail with reference to the accompanying drawings.

First Embodiment

Figure 1:
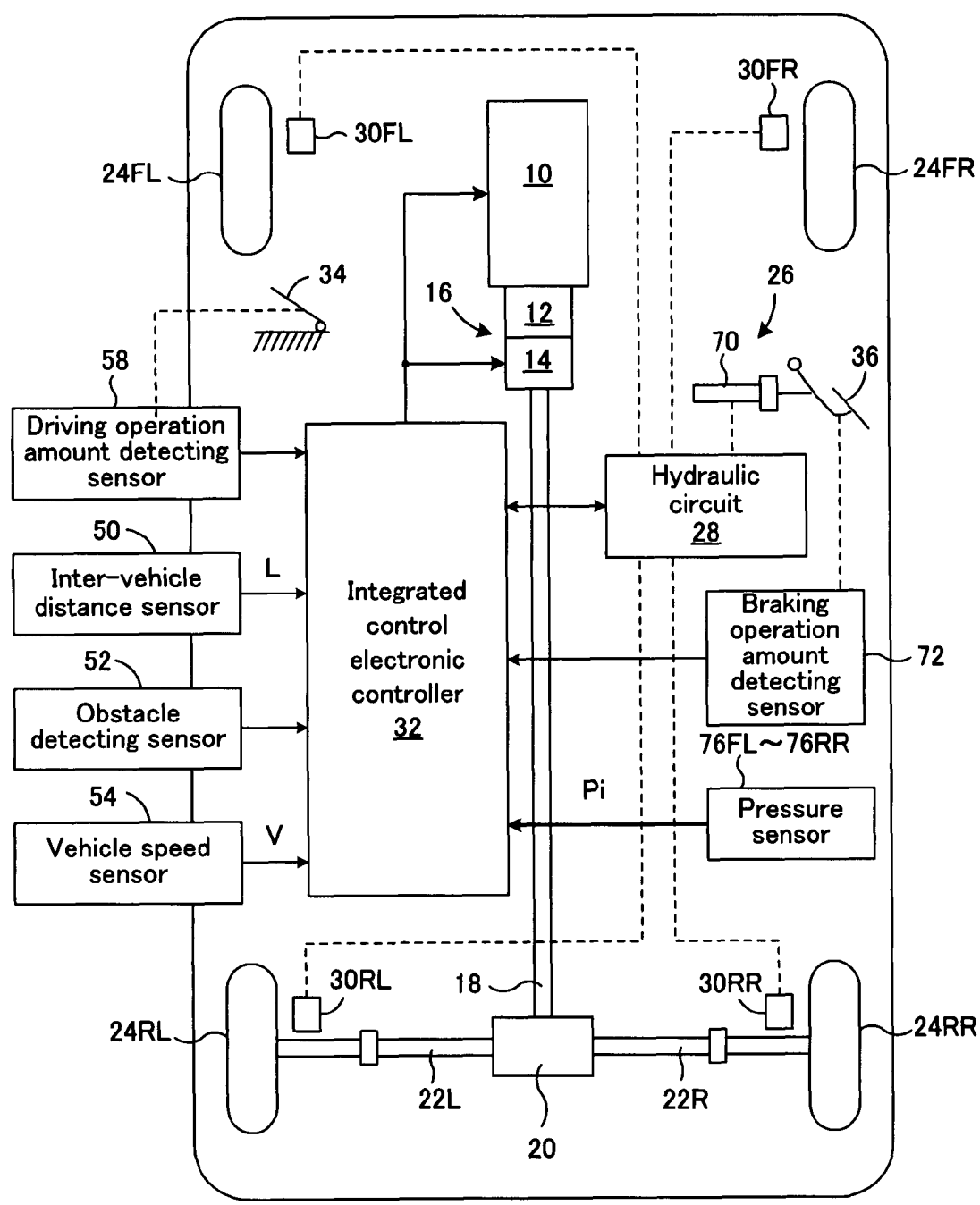
FIG. 1 is a schematic structural diagram showing a first embodiment of a vehicle integrated control apparatus according to the present invention applied to a rear-wheel-drive vehicle.
Figure 2:
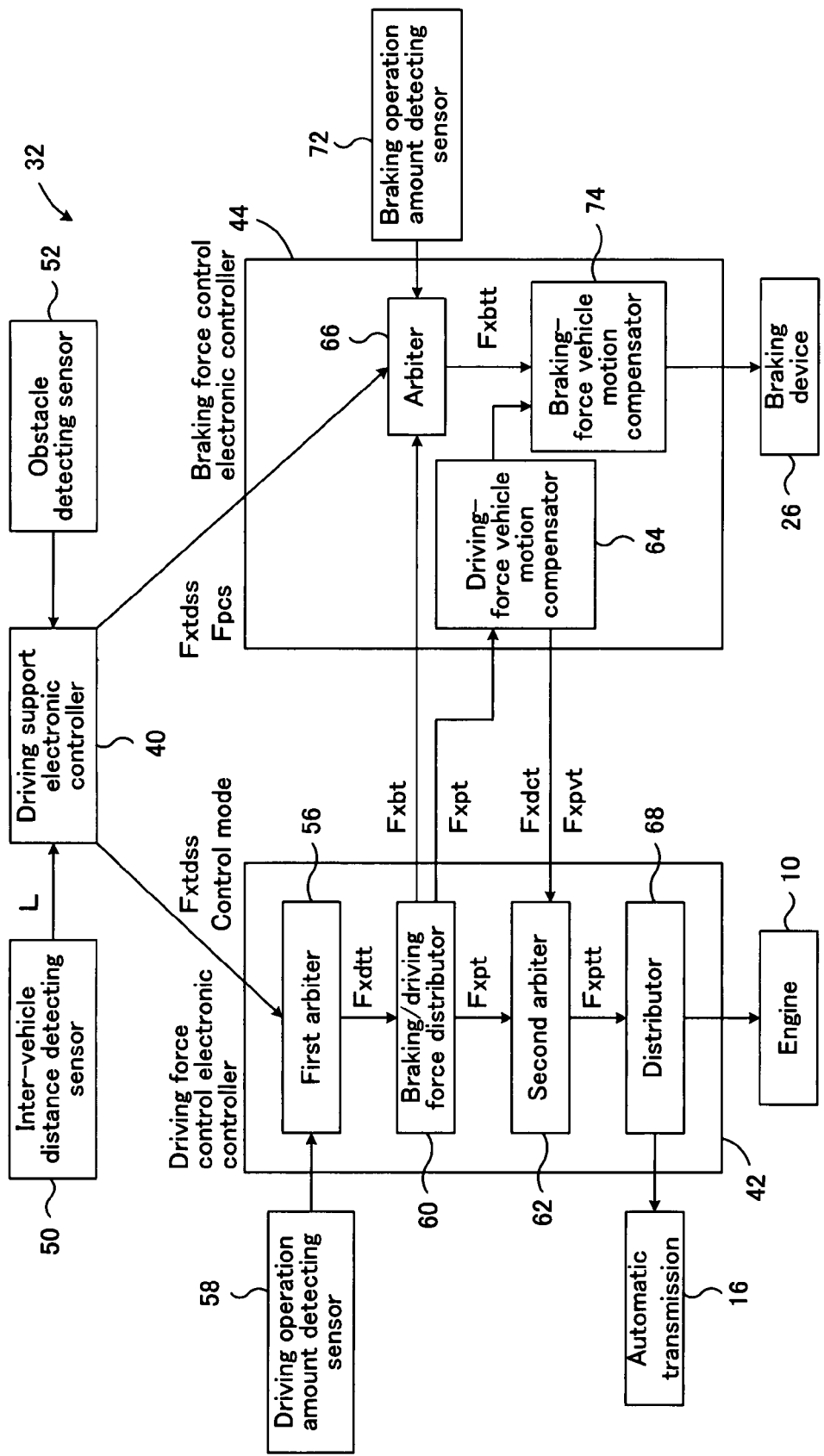
FIG. 2 is a block diagram showing a control system in the first embodiment.

FIG. 1 is a schematic structural diagram showing a first embodiment of a vehicle integrated control apparatus according to the present invention applied to a rear-wheel-drive vehicle, and FIG. 2 is a block diagram showing a control system in the first embodiment.

In FIG. 1, numeral 10 denotes an engine. The driving force of the engine 10 is transmitted to a propeller shaft 18 through an automatic transmission 16 including a torque converter 12 and a gear transmission mechanism 14. The driving force of the propeller shaft 18 is transmitted to an axle 22L of a rear-left wheel and an axle 22R of a rear-right wheel by a differential 20, whereby a rear-left wheel 24RL and a rear-right wheel 24RR, which are driving wheels, are rotatably driven.

On the other hand, a front-left wheel 24FL and front-right wheel 24FR are driven wheels as well as steered wheels. Although not shown in FIG. 1, the front-left wheel 24FL and front-right wheel 24FR are steered through a tie rod by a rack-and-pinion power steering device driven in response to the steering of the steering wheel by a driver.

The braking pressures of corresponding wheel cylinders 30FL, 30FR, 30RL, and 30RR are controlled by a hydraulic circuit 28 of a braking device 26, whereby the braking forces of the front-left wheel 24FL, front-right wheel 24FR, rear-left wheel 24RL, and rear-right wheel 24RR are controlled. Although not shown in FIG. 1, the hydraulic circuit 28 includes an oil reservoir, oil pump, various valve devices, etc.

The braking/driving force of a vehicle is controlled by an integrated control electronic controller 32. The integrated control electronic controller 32 controls, in a normal state, the output of the engine 10 and gear stage of the transmission 16 in accordance with the operation of an accelerator pedal 34 by a driver or engine load and controls the hydraulic circuit 28 in accordance with the step-on amount of a brake pedal 36 by a driver. It controls as necessary the output of the engine 10 and the gear stage of the transmission 16 in order to control the driving motion of the vehicle and controls the hydraulic circuit 28, thereby controlling the braking/driving force of the vehicle.

The integrated control of the braking/driving force executed by the integrated control electronic controller 32 will be explained in detail hereinafter. In the following explanation, the braking/driving force, driving force, and braking force all assume a value with the vehicle driving direction defined as positive. Therefore, in the comparison of plural braking forces, the smaller value represents the value having the greater braking strength.

As shown in FIG. 2, the integrated control electronic controller 32 has a driving support electronic controller 40 for supporting a driving by a driver, a driving force control electronic controller 42 for controlling a vehicle driving force, and a braking force control electronic controller 44 for controlling braking forces of wheels. Although not shown in detail in FIG. 2, the driving support electronic controller 40, the driving force control electronic controller 42, and the braking force control electronic controller 44 may be respectively composed of a microcomputer and a driving circuit, wherein the microcomputer includes a CPU, ROM, RAM, and input/output device, those of which are interconnected with one another via a bi-directional common bus.

Inputted to the driving support electronic controller 40 are a signal, indicating an inter-vehicle distance between the present vehicle and the preceding vehicle in front of the present vehicle, from an inter-vehicle distance detecting sensor 50 such as a radar, a signal indicating whether there is an obstacle or not in front of the vehicle from an obstacle detecting sensor 52 such as a CCD camera, and the like. When a switch of an inter-vehicle distance control, not illustrated in the figure, is in an ON state, the driving support electronic controller 40 calculates, as a driving support target braking/driving force Fxtdss, a target braking/driving force for causing the inter-vehicle distance between the present vehicle and the preceding vehicle to assume a value within a predetermined range on the basis of the inter-vehicle distance L between the present vehicle and the preceding vehicle inputted from the inter-vehicle distance detecting sensor 50 and a vehicle speed V inputted from a vehicle speed sensor 54.

When the inter-vehicle distance between the present vehicle and the preceding vehicle is smaller than a reference value, which is determined in accordance with the vehicle speed V, on the basis of the inter-vehicle distance L between the present vehicle and the preceding vehicle inputted from the inter-vehicle distance detecting sensor 50 and the vehicle speed V inputted from the vehicle speed sensor 54, the driving support electronic controller 40 performs auxiliary braking and calculates, as the driving support target braking/driving force Fxtdss, the target braking/driving force for achieving the safety inter-vehicle distance between the present vehicle and the preceding vehicle that is not less than the reference value.

The driving support electronic controller 40 determines the risk of the collision with the obstacle on the basis of the information of the presence of the obstacle in front of the vehicle inputted from the obstacle detecting sensor 52, the inter-vehicle distance L between the present vehicle and the obstacle in front of the vehicle inputted from the inter-vehicle distance detecting sensor 50, and the vehicle speed V inputted from the vehicle speed sensor 54, and when there is a risk of the collision with the obstacle, the driving support electronic controller 40 calculates, as the driving support target braking/driving force Fxtdss, the target braking/driving force for preventing the collision with the obstacle.

Further, when the driving support electronic controller 40 performs the aforesaid inter-vehicle distance control and calculates the driving support target braking/driving force Fxtdss, it outputs to the driving force control electronic controller 42 a signal indicating that the control mode for supporting a driver is in the inter-vehicle distance control and a signal indicating the driving support target braking/driving force Fxtdss. On the other hand, when the driving support electronic controller 40 performs the aforesaid auxiliary braking control and calculates the driving support target braking/driving force Fxtdss, it outputs to the driving force control electronic controller 42 a signal indicating that the control mode for supporting a driver is in the auxiliary braking control and a signal indicating the driving support target braking/driving force Fxtdss. Moreover, when the driving support electronic controller 40 performs the aforesaid collision preventing control and calculates the driving support target braking/driving force Fxtdss, it outputs to the braking force control electronic controller 44 an ON signal of a collision preventing control command flag Fpcs indicating that the control mode for supporting a driver is in the collision preventing control and a signal indicating the driving support target braking/driving force Fxtdss.

The driving force control electronic controller 42 has a first arbiter 56. A signal indicating an amount of a driving operation by a driver is also inputted to the first arbiter 56 from a driving operation amount detecting sensor 58 such as an accelerator opening sensor. The first arbiter 56 calculates a vehicle driver requested target driving force Fxddt on the basis of the amount of the driving operation by the driver inputted from the driving operation amount detecting sensor 58, calculates a vehicle total target braking/driving force Fxdtt by arbitrating the driver requested target driving force Fxddt and the driving support target braking/driving force Fxtdss in accordance with the control mode for supporting a driver, and outputs a signal indicating the total target braking/driving force Fxdtt to a braking/driving force distributor 60.

The braking/driving force distributor 60 distributes the vehicle total target braking/driving force Fxdtt to a vehicle target driving force Fxpt and a vehicle target braking force Fxbt. Then, the braking/driving force distributor 60 outputs a signal indicating the target driving force Fxpt to a second arbiter 62 and a driving-force vehicle motion compensator 64 of the braking force control electronic controller 44, and outputs a signal indicating the target braking force Fxbt to an arbiter 66 of the braking force control electronic controller 44.

The driving-force vehicle motion compensator 64 cancels a vehicle cornering drag force so as to calculate a vehicle motion compensation target driving force Fxdct for enhancing a vehicle ride quality evaluation. Then, the driving-force vehicle motion compensator 64 outputs a signal indicating the vehicle motion compensation target driving force Fxdct to the second arbiter 62 of the driving force control electronic controller 42.

The vehicle motion compensator 64 calculates motion control target braking/driving forces Fxvti (i=fl, fr, rl, rr) of the wheels in order to stabilize the vehicle behavior or prevent the deterioration of the vehicle behavior, and calculates a vehicle motion control target driving force Fxvdt that is the sum of the driving forces of the motion control target braking/driving forces Fxvti of the wheels. Then, the vehicle motion compensator 64 defines the greater value of the motion control target driving force Fxvdt and the vehicle target driving force Fxpt inputted from the braking/driving distributor 60 of the driving force control electronic controller 42 as the target driving force Fxpvt after the vehicle motion compensation, and outputs a signal indicating the target driving force Fxpvt to the second arbiter 62 of the driving force control electronic controller 42.

The second arbiter 62 of the driving force control electronic controller 42 arbitrates the target driving force Fxpt and the target driving force Fxpvt after the vehicle motion compensation so as to calculate the final target driving force Fxptt, corrects the final target driving force Fxptt by adding the vehicle motion compensation target driving force Fxdct to the final target driving force Fxptt, and outputs the final target driving force Fxptt after the modification to a distributor 68.

The distributor 68 calculates the target output of the engine 10 and the target gear stage of the transmission 16 on the basis of the final target driving force Fxptt after the modification, and controls such that the output of the engine 10 and the gear stage of the transmission 16 become the target output and target gear stage, respectively, whereby the distributor 68 controls the output of the engine 10 and the transmission 16 in such a manner that the vehicle driving force becomes the final target driving force Fxptt after the modification.

Inputted to the arbiter 66 of the braking force control electronic controller 44 are signals indicating an amount of the braking operation by a driver by a braking operation amount detecting sensor 72 such as a pressure sensor that detects the pressure in a master cylinder 70 of the braking device 26, a pedal effort sensor that detects an effort of the brake pedal 36, and a stroke sensor that detects a depression stroke of the brake pedal 36. The arbiter 66 calculates the driver requested braking force Fxdbt on the basis of the amount of the braking operation by the driver.

When the control mode for supporting a driver by the driving support electronic controller 40 is not in the collision preventing control, the arbiter 66 arbitrates the driver requested braking force Fxdbt and the target braking force Fxbt inputted from the braking/driving force distributor 60 so as to calculate the vehicle total target braking force Fxbtt, while when the control mode for supporting a driver by the driving support electronic controller 40 is in the collision preventing control, it defines the driving support target braking/driving force Fxtdss (collision preventing target braking force Fxbtpcs) inputted from the driving support electronic controller 40 as the vehicle total target braking force Fxbtt.

The arbiter 66 outputs a signal indicating the total target braking force Fxbtt to a braking-force vehicle motion compensator 74. The braking-force vehicle motion compensator 74 distributes the total target braking force Fxbtt to each wheel so as to calculate the target braking force Fwbtti of each wheel on the basis of the total target braking force Fxbtt. Signals indicating the braking pressures Pi (i=fl, fr, rl, rr) of the wheel cylinders 30FL to 30 RR of the wheels are inputted to the vehicle motion compensator 74 from the pressure sensors 76FL to 76RR provided so as to correspond to the respective wheels.

Inputted to the braking-force vehicle motion compensator 74 is a signal indicating the motion control target braking/driving forces Fxvti of the wheels for stabilizing the vehicle behavior or preventing the deterioration of the vehicle behavior from the driving-force vehicle motion compensator 64. The braking-force vehicle motion compensator 74 defines the smaller one of the target braking force Fwbtti and the motion control target braking/driving force Fxvti as the target braking forces Fwbti (i=fl, fr, rl, rr) of the wheels, and controls the braking forces of the wheels such that the braking forces of the respective wheels become the corresponding target braking forces Fwbti through the control of the hydraulic circuit 28 of the braking device 26 on the basis of the target braking forces Fwbti.

Although not shown in the figure, the driving force control electronic controller 42 has a monitor that monitors whether the driving support electronic controller 40 and the driving support target braking/driving force Fxtdss calculated by the driving support electronic controller 40 are normal or not. When the monitor determines that the driving support electronic controller 40 and the driving support target braking/driving force Fxtdss calculated by the driving support electronic controller 40 are abnormal, it outputs an instruction signal for stopping the driving support control and the transmission of signals to the driving support electronic controller 40 through a communication path between the driving force control electronic controller 42 and the driving support electronic controller 40, which is different from the communication path for transmitting the driving support target braking/driving force Fxtdss and the control mode, or through the braking force control electronic controller 44.

The braking force control electronic controller 44 has a monitor that monitors whether the communication between the driving force control electronic controller 42 and the braking force control electronic controller 44 is normal or not. When the monitor determines that the communication between the driving force control electronic controller 42 and the braking force control electronic controller 44 is abnormal, it directly outputs an instruction signal for stopping the driving support control and the transmission of signals to the driving support electronic controller 40 or it outputs the same instruction signal through a communication path between the driving force control electronic controller 42 and the driving support electronic controller 40, which is different from the communication path for transmitting the target braking force Fxbt and the like. The function of this monitor may be achieved by the monitor of the driving force control electronic controller 42.

The monitor of the braking force control electronic controller 44 also monitors whether the communication between the driving support electronic controller 40 and the braking force control electronic controller 44 is normal or not. When the monitor determines that the communication between the driving support electronic controller 40 and the braking force control electronic controller 44 is abnormal, it outputs an instruction signal for stopping the collision preventing control of driving support and the transmission of signals to the driving support electronic controller 40 through the communication path between the driving support electronic controller 40 and the braking force control electronic controller 44, which is different from the communication path for transmitting the target braking force Fxtdss, or through the driving force control electronic controller 42.

When any one of abnormalities occurs, it is preferable that an alarm device, not illustrated in the figure, is operated to make an alarm indicating that an abnormality corresponding to the vehicle occupant occurs.

Figure 3:
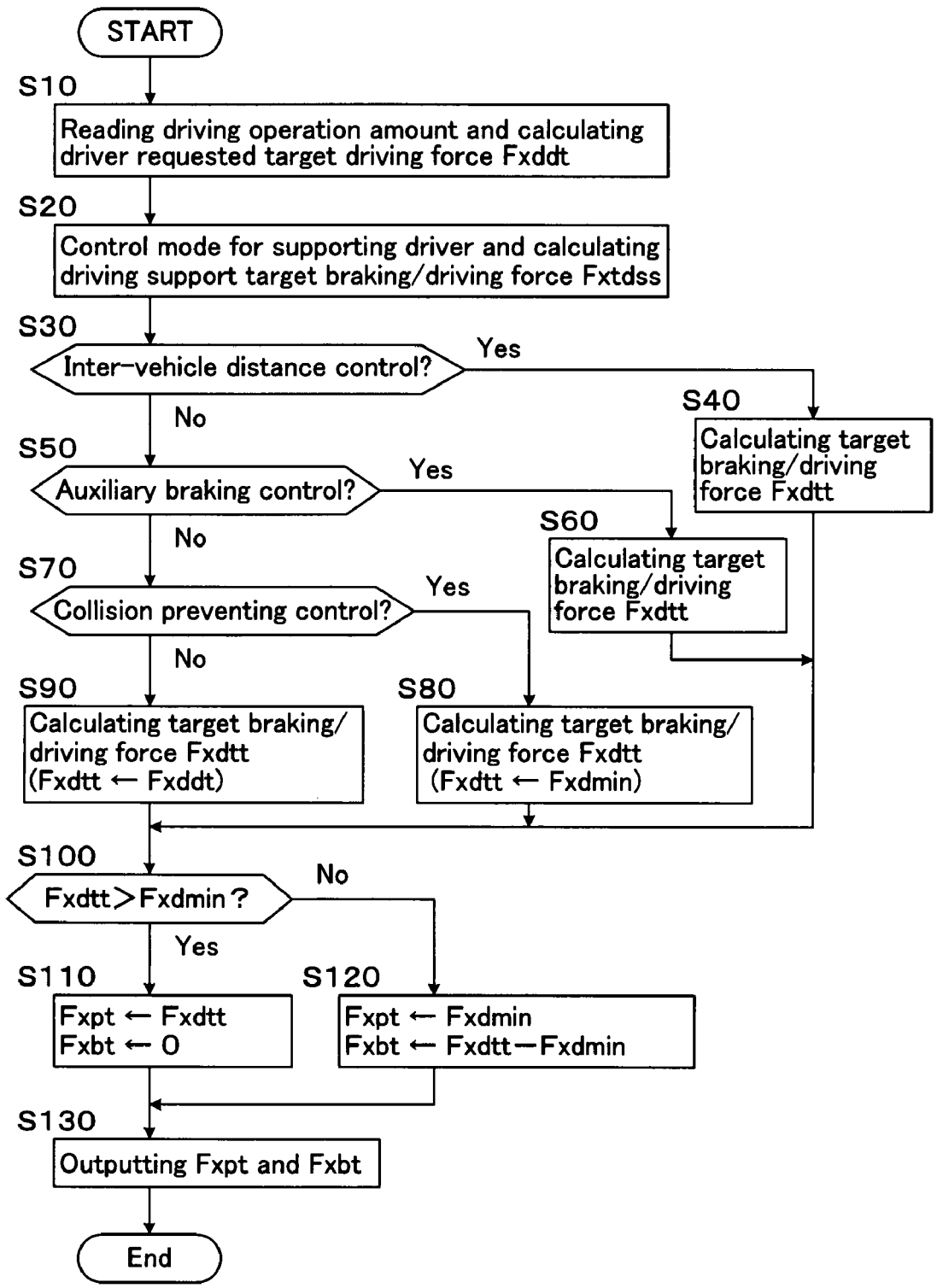
FIG. 3 is a flowchart showing an arbitration control routine by a first arbiter in a driving force control electronic controller and a distribution control routine of braking/driving force by a braking/driving force distributor in the first embodiment.

The arbitration control routine by the first arbiter 56 and the braking/driving force distribution control routine by the braking/driving force distributor 60 of the driving force control electronic controller 42 in the first embodiment will now be explained with reference to the flowchart shown in FIG. 3. In FIG. 3, steps 10 to 70 correspond to the arbitration control routine by the first arbiter 56, and steps 100 to 120 correspond to the braking/driving force distribution control routine by the braking/driving force distributor 60.

Firstly, at step 10, the signal indicating the amount of the driving operation by the driver detected by the driving operation amount detecting sensor 58 is read, and the vehicle driver requested target braking/driving force Fxddt is calculated on the basis of the amount of the driving operation by the driver. At step 20, the signals indicating the control mode for supporting the driver and the driving support target braking/driving force Fxtdss are read from the driving support electronic controller 40.

At step 30, it is determined whether the control mode for supporting the driver is in the inter-vehicle distance control or not. If the positive determination is made, the vehicle total target braking/driving force Fxdtt is set to the greater one of the driver requested target braking/driving force Fxddt and the driving support target braking/driving force Fxtdss at step 40, while if the negative determination is made, the program proceeds to step 50.

It is determined at step 50 whether the control mode for supporting the driver is in the auxiliary braking control or not. If the positive determination is made, the vehicle total target braking/driving force Fxdtt is set to the smaller one of the driver requested target braking/driving force Fxddt and the driving support target braking/driving force Fxtdss at step 60, while if the negative determination is made, the program proceeds to step 70.

It is determined at step 70 whether the control mode for supporting the driver is in the collision preventing control or not. If the positive determination is made, the vehicle total target braking/driving force Fxdtt is set to the minimum value Fxdmin of the mechanical generating driving force of the engine 10 and the transmission 16 at step 80, while if the negative determination is made, the vehicle total target braking/driving force Fxdtt is set to the driver requested target braking/driving force Fxddt at step 90.

It is determined at step 100 whether or not the vehicle total target braking/driving force Fxdtt is greater than the minimum value Fxdmin of the mechanical generating driving force of the engine 10 and the transmission 16. If the positive determination is made, the vehicle target driving force Fxpt is set to the vehicle total target braking/driving force Fxdtt and the vehicle target braking force Fxbt is set to 0 at step 110, while if the negative determination is made, the vehicle target driving force Fxpt is set to the minimum value Fxdmin of the mechanical generating driving force of the engine 10 and the transmission 16, and the vehicle target braking force Fxbt is set to the value Fxdtt−Fxdmin that is obtained by subtracting the minimum value Fxdmin from the vehicle total target braking/driving force Fxdtt at step 120.

At step 130, the signal indicating the target driving force Fxpt is outputted to the second arbiter 62 and the vehicle motion compensator 64 of the braking force control electronic controller 44, and the signal indicating the target braking force Fxbt is outputted to the arbiter 66 of the braking force control electronic controller 44.

Figure 4:
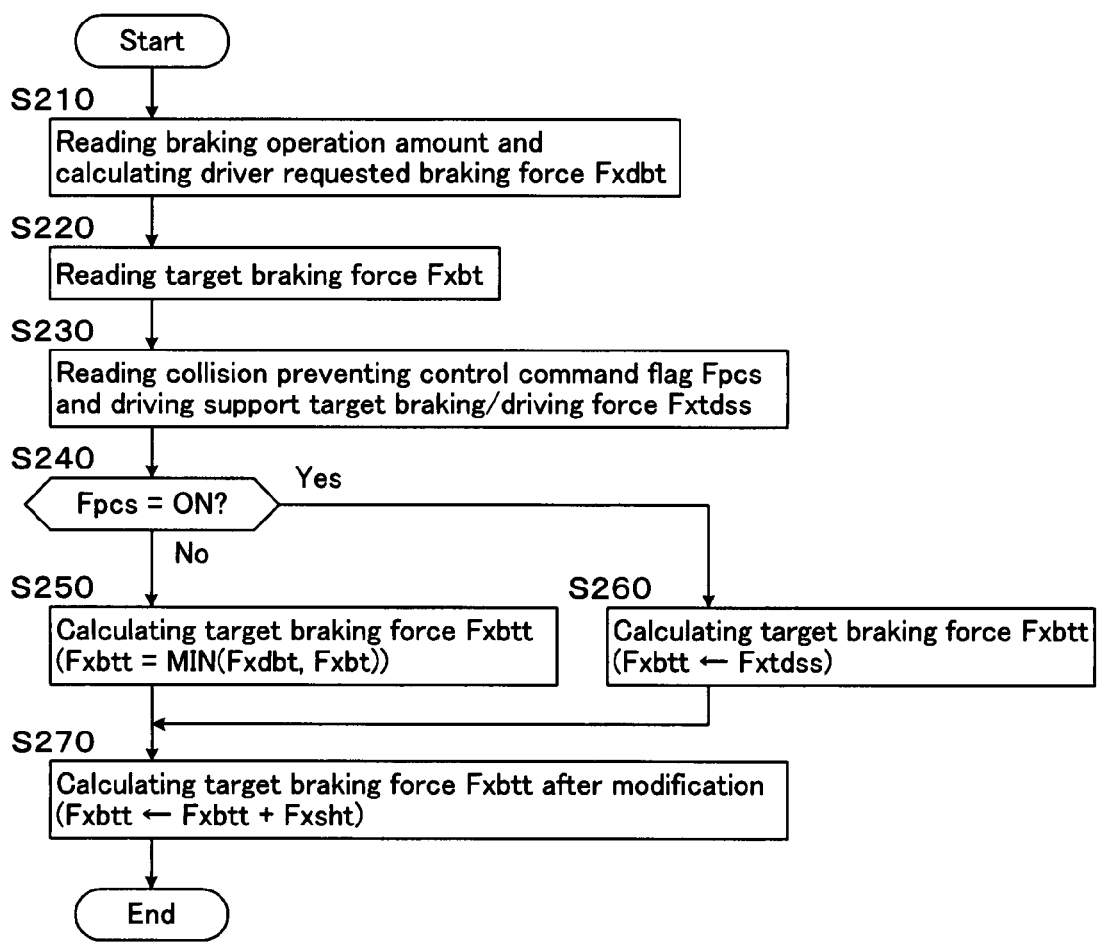
FIG. 4 is a flowchart showing an arbitration control routine by an arbiter of a braking force control electronic controller in the first embodiment.

The arbitration control routine by the arbiter 66 of the braking force control electronic controller 44 in the first embodiment will now be explained with reference to the flowchart shown in FIG. 4.

Firstly, at step 210, the signal indicating the amount of the braking operation by the driver detected by the braking operation amount detecting sensor 70 is read, and the driver requested braking force Fxdbt is calculated on the basis of the amount of the braking operation by the driver. At step 220, the signal indicating the vehicle target braking force Fxbt is read from the braking/driving force distributor 60 of the driving force control electronic controller 42, and at step 230, the signal indicating the collision preventing control command flag Fpcs and the signal indicating the driving support target braking/driving force Fxtdss are read.

It is determined at step 240 whether the collision preventing control command flag Fpcs is ON or not. If the negative determination is made, the vehicle total target braking force Fxbtt is set to the smaller one of the driver requested braking force Fxdbt and the vehicle target braking force Fxbt at step 250, while if the positive determination is made, the vehicle total target braking force Fxbtt is set to the driving support target braking/driving force Fxtdss of the collision preventing control at step 260.

At step 270, although not shown in the figure, a signal indicating a target braking force Fxsht for controlling the shift shock calculated by the driving force control electronic controller 42 is read, and the target driving force Fxsht is added to the vehicle total target braking force Fxbtt, thereby calculating the vehicle total target braking force Fxbtt after the modification.

Figure 5:
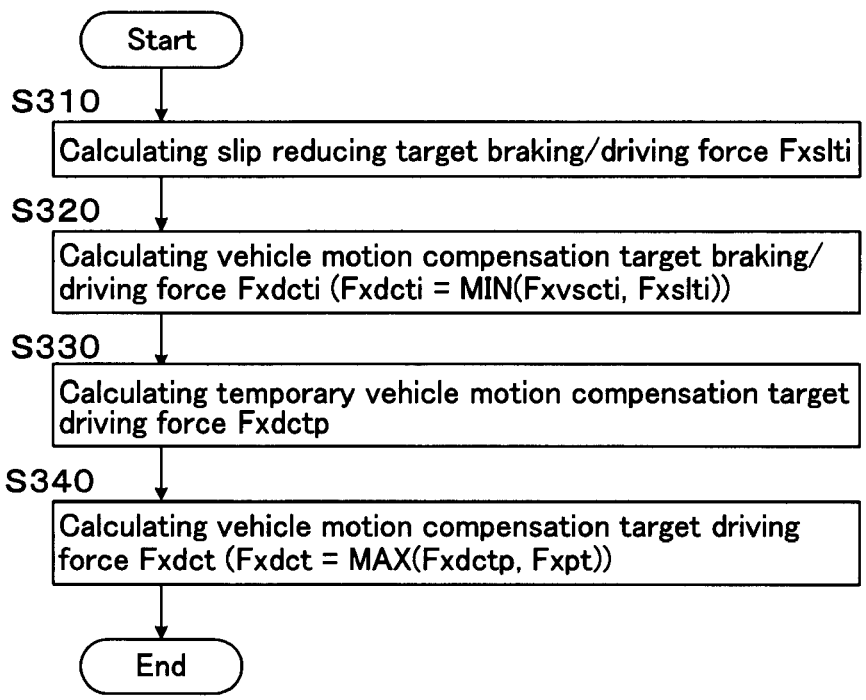
FIG. 5 is a flowchart showing a vehicle motion compensation control routine by a vehicle motion compensator in the braking force control electronic controller in the first embodiment.

The vehicle motion compensation control routine by the driving-force vehicle motion compensator 64 of the braking force control electronic controller 44 in the first embodiment will now be explained with reference to the flowchart shown in FIG. 5.

Firstly, at step 310, a vehicle target longitudinal force Fvsct and a target yaw moment Mvsct for stabilizing the vehicle behavior or preventing the deterioration in the vehicle behavior, such as an anti-spin control, anti-drift control, or tack-in control, are calculated in a manner known in the technical field, and behavior control target braking/driving forces Fxvscti (i=fl, fr, rl, rr) of the wheels for achieving the vehicle target longitudinal force Fvsct and the target yaw moment Mvsct are calculated.

At step 330, slip reducing target braking/driving forces Fxslti (i=fl, fr, rl, rr) of the wheels for reducing the driving slip or braking slip of the wheels so as to prevent the deterioration of the vehicle behavior are calculated, and at step 340, the smaller one of the behavior control target braking/driving force Fxvscti and the slip reducing target braking/driving force Fxslti is calculated as a vehicle motion compensation target braking/driving force Fxvti (i=fl, fr, rl, rr) for each wheel.

At step 350, the sum of the driving forces of the vehicle motion compensation target driving forces Fxvti is calculated as a temporary vehicle motion compensation target driving force Fxvdt with the case of the braking force defined as 0, and at step 360, the vehicle motion compensation target driving force Fxpvt is set to the greater one of the vehicle temporary vehicle motion compensation target driving force Fxvdt and the target driving force Fxpt inputted from the braking/driving force distributor 60 of the driving force control electronic controller 42.

Figure 6:
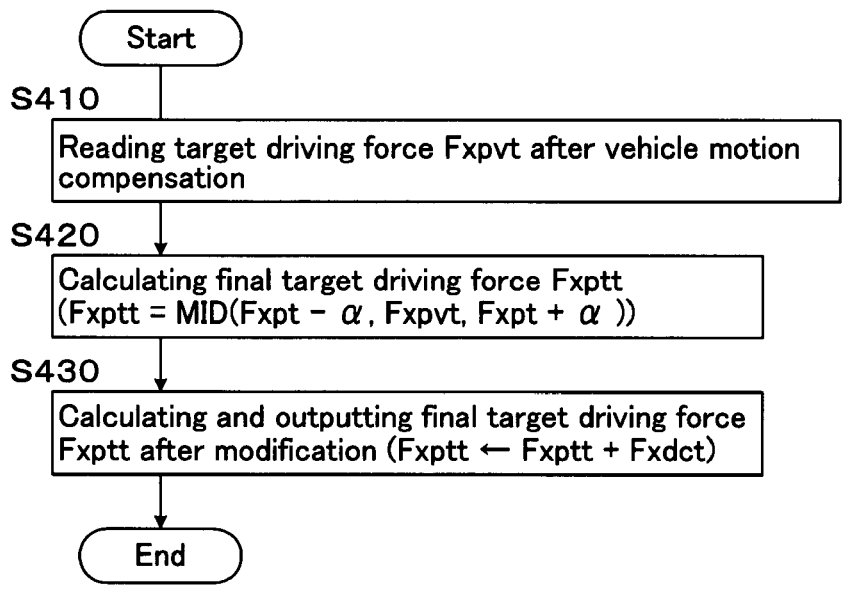
FIG. 6 is a flowchart showing an arbitration control routine by a second arbiter in the driving force control electronic controller in the first embodiment.

Next, an arbitration control routine by the second arbiter 62 of the driving force control electronic controller 42 in the first embodiment will be explained with reference to the flowchart shown in FIG. 6.

Firstly, at step 410, a signal indicating the target driving force Fxpvt after the vehicle motion compensation is read from the driving-force vehicle motion compensator 64 of the braking force control electronic controller 44, and at step 420, a final target driving force Fxptt is calculated, as the intermediate value among Fxpt−α, Fxpvt, and Fxpt+α, on the basis of the target driving force Fxpt and the target driving force Fxdct after the vehicle motion compensation with α defined as a positive constant. It is to be noted that α is a guard value for preventing that the final target driving force Fxptt becomes an abnormal value due to the abnormality of the braking force control electronic controller 44.

At step 430, a signal indicating the vehicle motion compensation target driving force Fxdct is read from the driving-force vehicle motion compensator 64 of the braking force control electronic controller 44, the final target driving force Fxptt after the modification is calculated by adding the vehicle motion compensation target driving force Fxdct to the final target driving force Fxptt, and a signal indicating the final target driving force Fxptt after the modification is outputted to the distributor 68.

Thus, according to the illustrated first embodiment, the driving support target braking/driving force Fxtdss is calculated by the driving support electronic controller 40, and transmitted to the first arbiter 56 of the driving force control electronic controller 42. The vehicle driver requested target braking/driving force Fxddt on the basis of the amount of the driving operation by a driver and the driving support target braking/driving force Fxtdss are arbitrated by the first arbiter 56, whereby the vehicle total target braking/driving force Fxdtt is calculated, and the vehicle total target braking/driving force Fxdtt is distributed to the vehicle target driving force Fxpt and the vehicle target braking force Fxbt by the braking/driving force distributor 60.

Then, the driving-force vehicle motion compensator 64 of the braking force control electronic controller 44 calculates the vehicle motion compensation target driving force Fxdct for enhancing the vehicle ride quality evaluation and the target driving force Fxpvt after the vehicle motion compensation for stabilizing the vehicle behavior or preventing the deterioration of the vehicle behavior. The final target driving force Fxptt is calculated by arbitrating the target driving force Fxpt and the target driving force Fxpvt after the vehicle motion compensation by the second arbiter 62 of the driving force control electronic controller 42. The vehicle motion compensation target driving force Fxdct is added to the final target driving force Fxptt, whereby the final target driving force Fxptt is corrected, and the distributor 68 controls the output of the engine 10 and the transmission 16 in such a manner that the vehicle driving force takes the final target driving force Fxptt after the modification.

The vehicle target braking force Fxbt is transmitted to the arbiter 66 of the braking force control electronic controller 44, and the vehicle total target braking force Fxbtt is calculated by arbitrating the driver requested braking force Fxdbt based upon the amount of the braking operation by a driver and the target braking force Fxbt by the arbiter 66. The target driving force Fxpv after the vehicle motion compensation for stabilizing the vehicle behavior or preventing the deterioration of the vehicle behavior is added to the vehicle total target braking force Fxbtt, and the target braking force Fwbti of each wheel is calculated on the basis of the vehicle total target braking force Fxbtt after the modification. Then, the braking device 26 is controlled such that the braking forces of the wheels become the corresponding target braking forces Fwbti.

Therefore, according to the illustrated first embodiment, the final target driving force Fxptt can be calculated on the basis of the target braking/driving force Fxtdss for the driving support and the driver requested target driving force Fxddt, and the target braking force Fwbti of each wheel can be calculated on the basis of the target braking/driving force Fxtdss for the driving support and the driver requested target braking force Fxdbt, whereby the braking/driving force of each wheel can be controlled on the basis of the braking/driving operation by a driver, while achieving the driving support by the automatic control of the braking/driving force.

Further, according to the illustrated first embodiment, it is unnecessary to transmit the information required for the arbitration of the driver requested target braking/driving force Fxddt and the driving support target braking/driving force Fxtdss and for the arbitration of the target braking/driving force Fxtdss for the driving support and the driver requested target driving force Fxddt to the driving support electronic controller 40 by the driving force control electronic controller 42 and/or the braking force control electronic controller 44. Therefore, compared to the case in which the aforesaid target value is arbitrated at the driving support electronic controller 40 and the signals indicating the target driving force and the target braking force are respectively transmitted to the driving force control electronic controller 42 and the braking force control electronic controller 44 by the driving support electronic controller 40, the amount of receiving and sending information between the driving support electronic controller 40 and the driving force control electronic controller 42 as well as the braking force control electronic controller 44 can surely be reduced.

Moreover, according to the illustrated first embodiment, when the driving support electronic controller 40 or the driving support target braking/driving force Fxtdss becomes abnormal, the transmission of the driving support target braking/driving force Fxtdss to the driving force control electronic controller 42 from the driving support electronic controller 40 is stopped, resulting in that it can surely be prevented that the influence caused by the driving support electronic controller 40 or the driving support target braking/driving force Fxtdss being abnormal is exerted on the controls of the driving force control electronic controller 42 and the braking force control electronic controller 44.

Similarly, when the driving force control electronic controller 42 or the vehicle target braking force Fxbt becomes abnormal, the transmission of the target braking/driving force Fxbt to the braking force control electronic controller 44 from the driving force control electronic controller 42 is stopped, resulting in that it can surely be prevented that the influence caused by the driving force control electronic controller 42 or the vehicle target braking force Fxbt being abnormal is exerted on the control of the braking force control electronic controller 44.

In particular, according to the illustrated first embodiment, when the driving support electronic controller 40 performs the collision preventing control and calculates the driving support target braking/driving force Fxtdss, a signal indicating the driving support target braking/driving force Fxtdss is directly transmitted to the braking force control electronic controller 44 with the ON signal of the collision preventing control command flag Fpcs indicating that the control mode for supporting the driver is in the collision preventing control, and the arbiter 66 of the braking force control electronic controller 44 defines the collision preventing target braking force Fxbtpcs as the vehicle total target braking force Fxbtt. Therefore, when an emergency braking for preventing the collision is required, the collision preventing target braking force Fxbtpcs can be transmitted to the arbiter 66 of the braking force control electronic controller 44 without delay. Accordingly, compared to the case in which the collision preventing target braking force Fxbtpcs is also transmitted to the braking force control electronic controller 44 through the driving force control electronic controller 42 as the driving support target braking/driving force Fxtdss, the emergency braking for preventing the collision can promptly be performed.

According to the illustrated first embodiment, the control mode for supporting the driver is also transmitted to the first arbiter 56 of the driving force control electronic controller 42 by the driving support electronic controller 40, and the first arbiter 56 arbitrates the driver requested target driving force Fxddt and the driving support target braking/driving force Fxtdss according to the control mode for supporting the driver, whereby the driver requested target driving force Fxddt and the driving support target braking/driving force Fxtdss can appropriately be arbitrated according to the control mode for supporting the driver by the driving support electronic controller 40.

Second Embodiment

Figure 7:
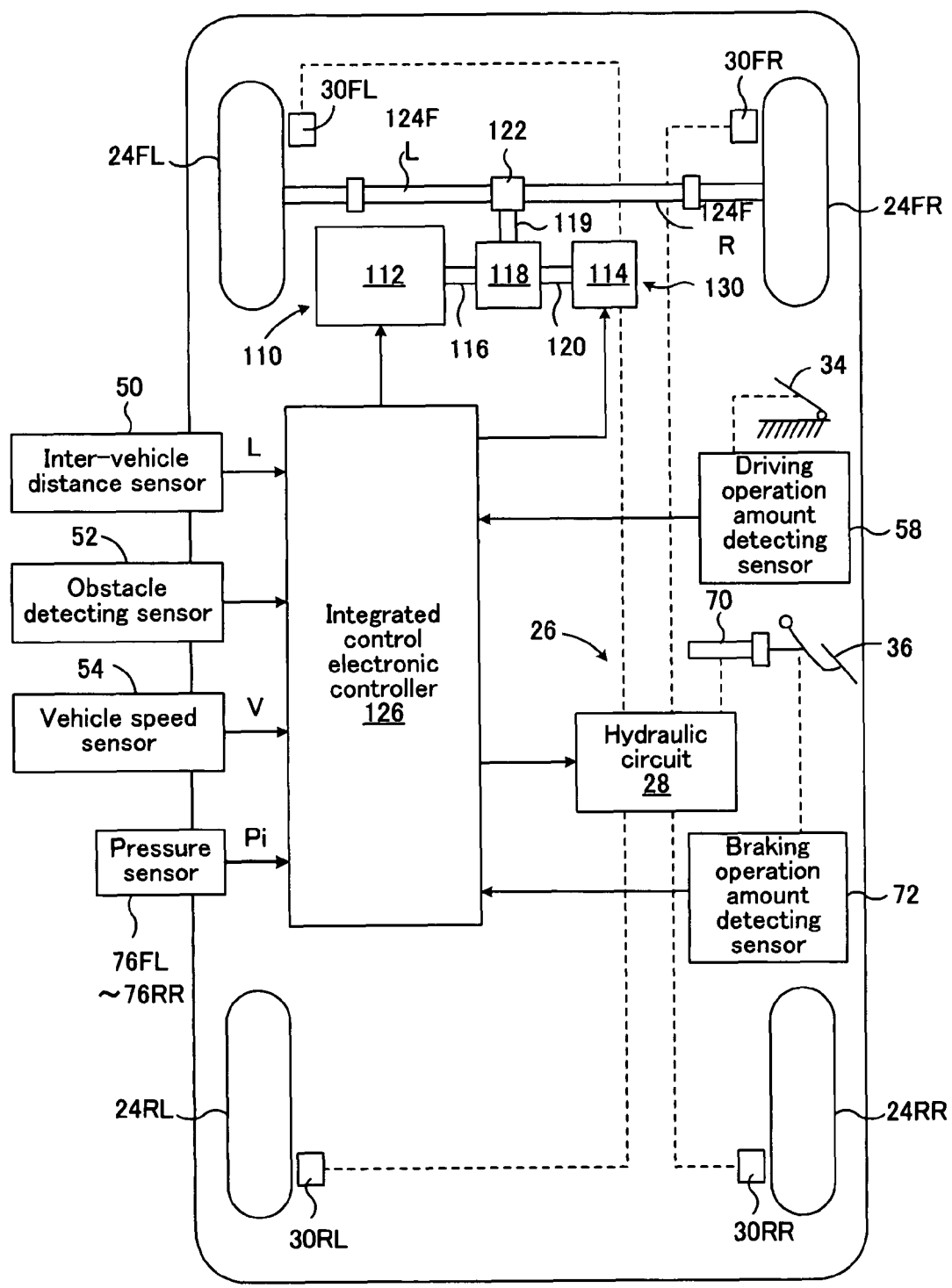
FIG. 7 is a schematic structural diagram showing a second embodiment of a vehicle integrated control apparatus according to the present invention applied to a front-wheel-drive vehicle provided with a hybrid system.
Figure 8:
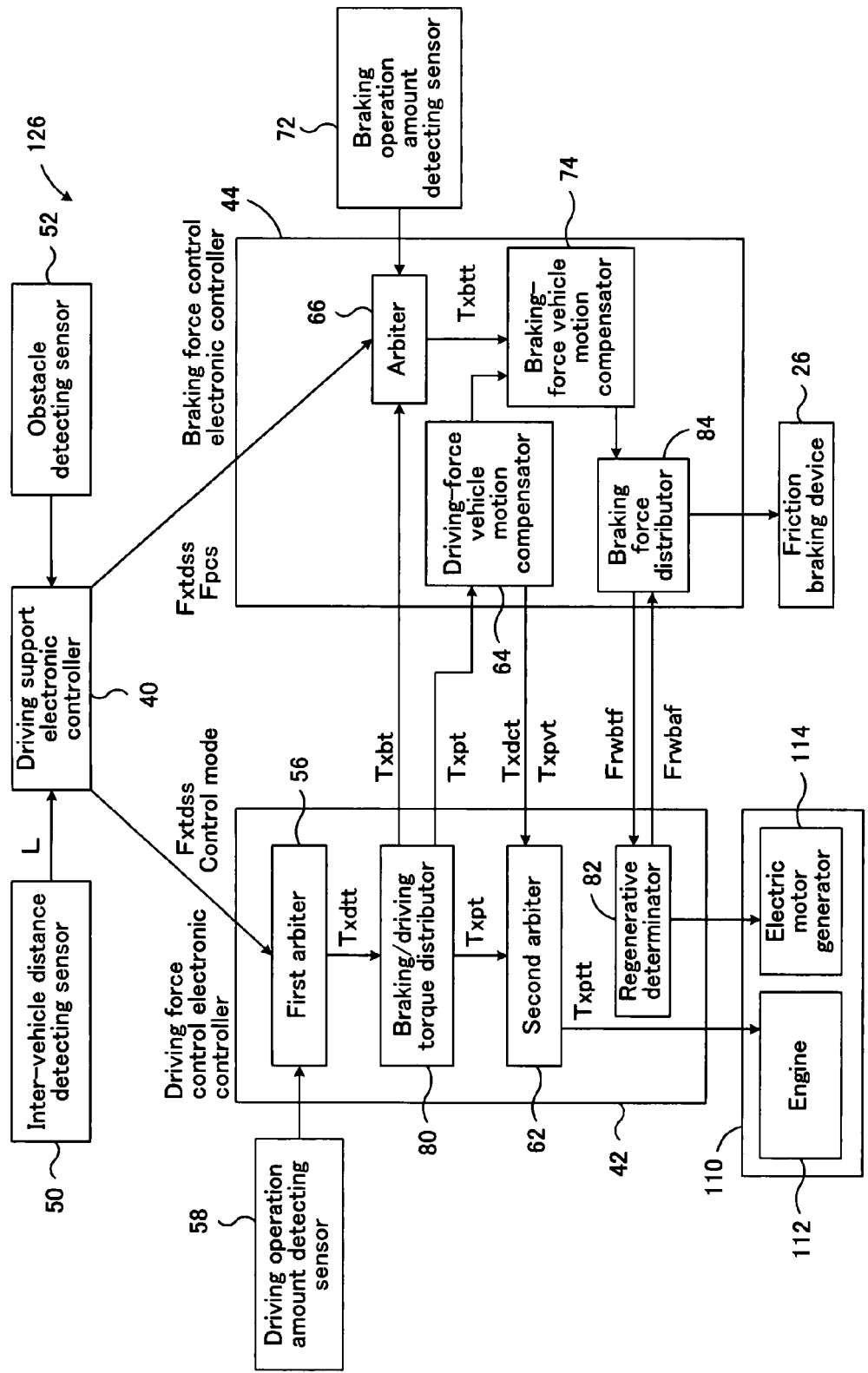
FIG. 8 is a block diagram showing a control system of the second embodiment.

FIG. 7 is a schematic structural diagram showing a second embodiment of a vehicle integrated control apparatus according to the present invention applied to a front-wheel-drive vehicle provided with a hybrid system, and FIG. 8 is a block diagram showing a control system of the second embodiment. In FIGS. 7 and 8, the components same as those shown in FIGS. 1 and 2 numerals are identified by the same numerals in FIGS. 1 and 2.

In FIG. 7, numeral 110 denotes a hybrid system that drives front wheels. The hybrid system 110 includes a gasoline engine 112 and an electric motor generator 114. The output shaft 116 of the gasoline engine 112 is coupled to an input shaft of a continuously variable transmission 118 having a clutch incorporated therein. The input shaft of the continuously variable transmission 118 is also coupled to the output shaft 120 of the electric motor generator 114. The rotation of the output shaft 119 of the continuously variable transmission 118 is transmitted to axels 124FL and 124FR for a front-left wheel and a front-right wheel through a front differential 122, whereby the front-left wheel 24FL and the front-right wheel 24FR are rotatably driven.

The gasoline engine 112 and the electric motor generator 114 of the hybrid system 110 are controlled by an integrated control electronic controller 126 in accordance with a step-on amount of an accelerator pedal 34 by a driver and vehicle running condition. The electric motor generator 114 functions as a motor generator of a front-wheel regenerative braking device 128, wherein the function as the regenerative motor generator (regenerative braking) is also controlled by the integrated control electronic controller 126.

In the illustrated embodiment, in particular, when a shift lever, not shown, is at a D-range, the hybrid system 110 generates driving force or engine brake force by the gasoline engine 112 or by the gasoline engine 112 and the electric motor generator 114 upon the normal running (normal driving mode), while when the shift lever is at the D-range but a load is low, the hybrid system 110 generates the driving force only by the electric motor generator 114 (electric vehicle mode). When the shift lever is at a B-range, the hybrid system 110 generates the driving force or engine brake force by the gasoline engine 112 and the electric motor generator 114, but the engine brake force in this case is higher than that in the case of the D-range (engine brake mode). When the shift lever is at the D-range and the brake pedal 134 is depressed by a driver, the electric motor generator 114 functions as the regenerative motor generator.

The friction braking forces of the front-left wheel 24FL, front-right wheel 24FR, rear-left wheel 24RL, and rear-right wheel 24RR are controlled by controlling the braking pressures of the corresponding wheel cylinders 30FL, 30FR, 30RL, and 30RR by the hydraulic circuit 28 of the friction braking device 26. Although not shown in the figure, the hydraulic circuit 28 includes a reservoir, oil pump, various valve devices, etc. The braking pressure of each wheel cylinder is controlled by the integrated control electronic controller 126 in accordance with the depression amount of the brake pedal 36 by a driver upon the normal state.

As shown in FIG. 8, the integrated control electronic controller 126 has a driving support electronic controller 40 for supporting a driving by a driver, a driving force control electronic controller 42 for controlling a vehicle driving force, and a braking force control electronic controller 44 for controlling a braking force of each wheel. Although not shown in FIG. 8 in detail, the driving support electronic controller 40, the driving force control electronic controller 42, and the braking force control electronic controller 44 may be respectively composed of a microcomputer and a driving circuit, wherein the microcomputer includes a CPU, ROM, RAM, and input/output device, those of which are interconnected with one another via a bi-directional common bus.

The driving support electronic controller 40 functions in the same manner as the driving support electronic controller 40 in the first embodiment. When it performs an inter-vehicle distance control and calculates the driving support target braking/driving force Fxtdss, it outputs to the driving force control electronic controller 42 a signal indicating that the control mode for supporting the driver is in the inter-vehicle distance control and a signal indicating the driving support target braking/driving force Fxtdss. On the other hand, when the driving support electronic controller 40 performs the aforesaid auxiliary braking control and calculates the driving support target braking/driving force Fxtdss, it outputs to the driving force control electronic controller 42 a signal indicating that the control mode for supporting the driver is in the auxiliary braking control and a signal indicating the driving support target braking/driving force Fxtdss. Moreover, when the driving support electronic controller 40 performs the aforesaid collision preventing control and calculates the driving support target braking/driving force Fxtdss, it outputs to the braking force control electronic controller 44 an ON signal of the collision preventing control command flag Fpcs indicating that the control mode for supporting the driver is in the collision preventing control and a signal indicating the driving support target braking/driving force Fxtdss.

The driving force control electronic controller 42 has a first arbiter 56, braking/driving torque distributor 80, second arbiter 62, and regenerative determinator 82. The first arbiter 56 calculates the vehicle driver requested target braking/driving force Fxddt on the basis of the amount of the driving operation by a driver inputted from the driving operation amount detecting sensor 58, and calculates the vehicle total target braking/driving force Fxdtt by arbitrating the driver requested target braking/driving force Fxddt and the driving support target braking/driving force Fxtdss, like the first arbiter 56 in the first embodiment. Then, the first arbiter 56 calculates a vehicle total target braking/driving torque Txdtt, as the value corresponding to the target braking/driving torque at the output shaft 119 of the continuously variable transmission 118, on the basis of the total target braking/driving force Fxdtt, and outputs a signal indicating the total target braking/driving torque Txdtt to the braking/driving torque distributor 80.

The braking/driving torque distributor 80 distributes the vehicle total target braking/driving torque Txdtt to a vehicle target driving torque Txpt and a vehicle target braking torque Txbt. Then, the braking/driving torque distributor 80 outputs a signal indicating the target driving torque Txpt to the second arbiter 62 and the driving-force vehicle motion compensator 64 of the braking force control electronic controller 44, and outputs a signal indicating the target braking toque Txbt to the arbiter 66 of the braking force control electronic controller 44.

The driving-force vehicle motion compensator 64 cancels the vehicle drag force so as to calculate a vehicle motion compensation target driving torque Txdct for enhancing a vehicle ride quality evaluation. Then, the driving-force vehicle motion compensator 64 outputs a signal indicating the vehicle motion compensation target driving torque Txdct to the second arbiter 62 of the driving force control electronic controller 42.

The vehicle motion compensator 64 calculates motion control target braking/driving torques Txvti (i=fl, fr, rl, rr) of the wheels in order to stabilize the vehicle behavior or prevent the deterioration of the vehicle behavior, and calculates a vehicle motion control target driving torque Txvdt that is the sum of the driving torques of the motion control target braking/driving torques Txvti of the wheels. Then, the vehicle motion compensator 64 defines the greater value of the motion control target driving torque Txvdt and the vehicle target driving torque Txpt inputted from the braking/driving torque distributor 80 of the driving force control electronic controller 42 as the target driving torque Txpvt after the vehicle motion compensation, and outputs a signal indicating the target driving torque Txpvt to the second arbiter 62 of the driving force control electronic controller 42.

The second arbiter 62 of the driving force control electronic controller 42 arbitrates the target driving torque Txpt and the target driving torque Txpvt after the vehicle motion compensation so as to calculate the final target driving torque Txptt, corrects the final target driving torque Txptt by adding the vehicle motion compensation target driving torque Txdct to the final target driving torque Txptt. The second arbiter 62 calculates the target outputs of the gasoline engine 112 and the electric motor generator 114 and the target gear ratio of the continuously variable transmission 118 on the basis of the final target driving torque Txptt after the modification, and controls such that the outputs of the gasoline engine 112 and the electric motor generator 114 become the corresponding target outputs, and the gear ratio of the continuously variable transmission 118 becomes the target gear ratio, whereby the hybrid system 110 is controlled in such a manner that the vehicle driving force becomes the final target driving torque Txptt after the modification.

Inputted to the arbiter 66 of the braking force control electronic controller 44 are signals indicating the amount of the braking operation by a driver from a braking operation amount detecting sensor 72 such as a pressure sensor that detects the pressure in a master cylinder 70 of the braking device 26, a pedal effort sensor that detects an effort of the brake pedal 36, and a stroke sensor that detects a depression stroke of the brake pedal 36. The arbiter 66 calculates the driver requested braking torque Txdbt on the basis of the amount of the braking operation by the driver.

When the control mode for supporting a driver by the driving support electronic controller 40 is not in the collision preventing control, the arbiter 66 arbitrates the driver requested braking torque Txdbt and the target braking torque Txbt inputted from the braking/driving torque distributor 80 so as to calculate the vehicle total target braking torque Txbtt, while when the control mode for supporting a driver by the driving support electronic controller 40 is in the collision preventing control, it defines the collision preventing target braking torque Txbtpcs inputted from the driving support electronic controller 40 as the vehicle total target braking torque Txbtt.

The arbiter 66 outputs a signal indicating the total target braking torque Txbtt to the braking-force vehicle motion compensator 74. The braking-force vehicle motion compensator 74 distributes the total target braking torque Txbtt to each wheel so as to calculate the target braking forces Fwbtti (i=fl, fr, rl, rr) of the wheels on the basis of the total target braking torque Txbtt. Signals indicating the braking pressures Pi (i=fl, fr, rl, rr) of the wheel cylinders 30FL to 30 RR of the wheels are inputted to the vehicle motion compensator 74 from the pressure sensors 76FL to 76RR provided so as to correspond to the respective wheels.

Inputted to the braking-force vehicle motion compensator 74 is a signal indicating the motion control target braking/driving forces Fxvti of the wheels for stabilizing the vehicle behavior or preventing the deterioration of the vehicle behavior from the driving-force vehicle motion compensator 64. The braking-force vehicle motion compensator 74 defines the smaller one of the target braking force Fwbtti and the motion control target braking/driving force Fxvti as the target braking forces Fwbti (i=fl, fr, rl, rr) of the wheels, and outputs signals indicating the target braking forces Fwbti to the braking force distributor 84.

The braking force distributor 84 calculates the target regenerative braking forces Frwbtf of the front-left wheel and front-right wheel on the basis of the target braking forces Fwbtfl and Fwbtfr of the front-left wheel and front-right wheel, and outputs signals indicating the target regenerative braking forces Frwbtf to the regenerative determinator 82 of the driving force control electronic controller 42. Signals indicating the actual regenerative braking forces Frwbaf of the front-left wheel and front-right wheel are inputted to the braking force distributor 84 by the regenerative determinator 82. The braking force distributor 84 calculates the target friction braking forces Ffwbtfl and Ffwbtfr of the front-left wheel and front-right wheel by subtracting Frwbaf/2 from the target braking forces Fwbtfl and Fwbtfr of the front-left wheel and front-right wheel, and defines the target braking forces Fwbtrl and Fwbtrr of the rear-left wheel and rear-right wheel as the target friction braking forces Ffwbtrl and Ffwbtrr of the rear-left wheel and rear-right wheel.

The regenerative determinator 82 controls the electric motor generator 114 of the hybrid system 110 on the basis of the target regenerative braking force Frwbtf such that the regenerative braking forces of the front-left wheel and the front-right wheel become the target regenerative braking forces Frwbtf of the front-left wheel and the front-right wheel. The braking force distributor 84 controls such that the friction braking force of each wheel becomes the corresponding target friction braking force Ffwbti through the control of the hydraulic circuit 28 of the friction braking device 26.

Thus, according to the illustrated second embodiment, the operation and effect same as those in the first embodiment can be obtained even in case where the vehicle driving means is a hybrid system. Further, the regenerative braking by the electric motor generator of the hybrid system is effectively utilized, to control the braking force of each wheel.

The present invention has been explained in detail with respect to the specific embodiments, but the invention is not limited to the above-mentioned embodiments. It would be apparent to those skilled in the art that various other modifications are possible within the scope of the present invention.

For example, the control modes for driving support by the driving support electronic controller 40 are the inter-vehicle distance control for causing the inter-vehicle distance between the present vehicle and the preceding vehicle to assume a value within a predetermined range, an auxiliary braking control for causing the inter-vehicle distance between the present vehicle and the preceding vehicle to be the safety inter-vehicle distance not less than a reference value, and a collision preventing control for preventing a collision with an obstacle. However, the control modes for driving support are not limited to the illustrated control modes, so long as they are modes for supporting a driving by a driver through the control of a vehicle braking/driving force, and further, any one of the aforesaid control modes for driving support may be omitted.

Although the vehicle is a rear-wheel-drive vehicle in the first embodiment, the integrated control apparatus according to the present invention is applicable to a front-wheel-drive vehicle or four-wheel-drive vehicle. Similarly, although the vehicle is a front-wheel-drive vehicle having front wheels driven by a hybrid system in the second embodiment, the integrated control apparatus according to the present invention is applicable to a rear-wheel-drive vehicle having rear wheels driven by a hybrid system, a four-wheel-drive vehicle having front wheels driven by a hybrid system and rear wheels driven by an auxiliary electric motor generator, or four-wheel-drive vehicle having front wheels and rear wheels driven by a hybrid system.

Although the control amount that is received and transmitted between the regenerative determinator 82 and the braking force distributor 84 is a braking force in the second embodiment, it may be, for example, a braking torque at the output shaft of the hybrid system.

What is claimed is:

1. A vehicle integrated control apparatus comprising:
    a driving support calculation control unit that calculates a vehicle target braking/driving control amount for performing a driving support by an automatic control of a braking/driving force;
    a driving amount calculation control unit that calculates a driver requested driving control amount on the basis of a driving operation by a driver and controls a driving unit on the basis of a final target driving control amount based upon at least said driver requested driving control amount; and
    a braking amount calculation control unit that calculates a driver requested braking control amount on the basis of a braking operation by a driver and controls a braking unit on the basis of a final target braking control amount based upon at least said driver requested braking control amount,
    wherein said target braking/driving control amount by said driving support calculation control unit is transmitted to said driving amount calculation control unit, and said driving amount calculation control unit calculates said final target driving control amount by arbitrating said target braking/driving control amount and said driver requested driving control amount, and
    wherein said driving amount calculation control unit distributes the target braking/driving control amount after the arbitration to a target driving control amount and a target braking control amount, wherein said target braking control amount is transmitted to said braking amount calculation control unit by said driving amount calculation control unit.

2. A vehicle integrated control apparatus according to claim 1, wherein
    said braking amount calculation control unit calculates said final target braking control amount by arbitrating said driver requested braking control amount and said target braking control amount.

3. A vehicle integrated control apparatus according to claim 2, wherein
    said braking amount calculation control unit corrects said target braking control amount after the arbitration with a correction amount for ensuring a stable running of the vehicle, and calculates said final target braking control amount on the basis of said target braking control amount after the modification.

4. A vehicle integrated control apparatus according to claim 2, wherein
    said driving unit includes a hybrid system provided with an internal combustion engine and an electric motor generator.

5. A vehicle integrated control apparatus according to claim 4, wherein
    said electric motor generator has a regenerative function; said braking amount calculation control unit distributes said final target braking control amount to a target friction braking control amount and a target regenerative braking control amount; and said target regenerative braking control amount is transmitted from said braking amount calculation control unit to said driving amount calculation control unit.

6. A vehicle integrated control apparatus according to claim 5, wherein
    said driving amount calculation control unit controls said internal combustion engine on the basis of said final target driving control amount and controls said electric motor generator on the basis of said target regenerative braking control amount.

7. A vehicle integrated control apparatus according to claim 1, wherein
    said driving support calculation control unit calculates a risk avoidance target braking amount, when an emergency braking for avoiding a risk is necessary, and said risk avoidance target braking amount is directly transmitted to said braking amount calculation control unit by said driving support calculation control unit.

8. A vehicle integrated control apparatus according to claim 7, wherein
    said braking amount calculation control unit calculates said final target braking control amount by arbitrating said driver requested braking control amount, said target braking control amount, and said risk avoidance target braking amount.

9. A vehicle integrated control apparatus according to claim 8, wherein
    said braking amount calculation control unit defines said risk avoidance target braking amount as said final target braking control amount, when it receives said risk avoidance target braking amount from said driving support calculation control unit, and said braking amount calculation control unit calculates said final target braking control amount by arbitrating said driver requested braking control amount and said target braking control amount, when it does not receive said risk avoidance target braking amount from said driving support calculation control unit.

10. A vehicle integrated control apparatus according to claim 1, wherein said driving support calculation control unit calculates said target braking/driving control amount in accordance with a control mode of a driving support, and said control mode of the driving support is also transmitted from said driving support calculation control unit to said driving amount calculation control unit.

11. A vehicle integrated control apparatus according to claim 1, wherein said driving support calculation control unit stops the calculation of said target braking/driving control amount and the transmission to said driving amount calculation control unit, when something abnormal occurs on the communication from said driving amount calculation control unit to said braking amount calculation control unit.

12. A vehicle integrated control apparatus according to claim 1, wherein said driving support is the automatic control of the braking/driving force for making the distance between the present vehicle and the preceding vehicle constant.

13. A vehicle integrated control apparatus according to claim 1, wherein said driving support is the automatic control of the braking/driving force for preventing that the distance between the present vehicle and the preceding vehicle becomes less than a reference value.

14. A vehicle integrated control apparatus according to claim 1, wherein said driving support is the automatic control of the braking/driving force for preventing the collision with an obstacle in front of the vehicle.

15. A vehicle integrated control apparatus according to claim 1, wherein said target driving control amount is also transmitted from said driving amount calculation control unit to said braking amount calculation control unit, and said braking amount calculation control unit corrects said target driving control amount with a correction amount for ensuring a stable running of the vehicle and transmits said target driving control amount after the modification to said driving amount calculation control unit.

16. A vehicle integrated control apparatus according to claim 15, wherein said driving amount calculation control unit calculates said final target driving control amount on the basis of said target driving control amount before the modification and said target driving control amount after the modification.

17. A vehicle integrated control apparatus according to claim 1, wherein the driving amount calculation control unit includes a first arbiter that calculates a vehicle total target braking/driving force by arbitrating the driver requested driving control amount and the vehicle target braking/driving control amount for performing a driving support and the first arbiter outputs the target braking/driving control amount, which is a signal indicating the vehicle total target braking/driving force, to a braking/driving force distributor of the driving amount calculation control unit.

18. A vehicle integrated control apparatus according to claim 17, wherein the braking/driving force distributor distributes the vehicle total target braking/driving force into a vehicle target driving force and a vehicle target braking force; outputs the target driving control amount, which is a signal indicating the target driving force, to a second arbiter of the driving amount calculation control unit and to a driving-force vehicle motion compensator of the braking amount calculation control unit; and outputs the target braking control amount, which is a signal indicating the target braking force, to an arbiter of the braking amount calculation control unit.

19. A vehicle integrated control apparatus according to claim 18, wherein the arbiter of the braking amount calculation control unit arbitrates the driver requested braking control amount, the target braking control amount inputted from the braking/driving force distributor, and the vehicle target braking/driving control amount for performing a driving support so as to calculate a vehicle total target braking force.

* * * * *